US008967889B2

(12) United States Patent
Kessler et al.

(10) Patent No.: US 8,967,889 B2
(45) Date of Patent: Mar. 3, 2015

(54) PANNING SLIDER

(71) Applicant: Kessler Crane, Inc., Plymouth, IN (US)

(72) Inventors: Eric H Kessler, Bremen, IN (US);
Richard Eggink, Granger, IN (US);
Kevin P Mott, Bremen, IN (US)

(73) Assignee: Kessler Crane, Inc., Plymouth, IN (US)

( * ) Notice: Subject to any disclaimer, the term of this patent is extended or adjusted under 35 U.S.C. 154(b) by 0 days.

(21) Appl. No.: 14/245,369

(22) Filed: Apr. 4, 2014

(65) Prior Publication Data

US 2014/0319300 A1    Oct. 30, 2014

Related U.S. Application Data

(60) Provisional application No. 61/816,218, filed on Apr. 26, 2013.

(51) Int. Cl.
G03B 17/00 (2006.01)
G03B 17/56 (2006.01)
F16M 11/18 (2006.01)
F16M 11/42 (2006.01)

(52) U.S. Cl.
CPC ............ G03B 17/561 (2013.01); F16M 11/18 (2013.01); F16M 11/425 (2013.01)
USPC ........................................................ 396/428

(58) Field of Classification Search
USPC ........................................................ 396/428
See application file for complete search history.

(56) References Cited

U.S. PATENT DOCUMENTS

2006/0176654 A1* 8/2006 Kfoury .......................... 361/681
2008/0261784 A1* 10/2008 Osbak ............................. 482/92
2009/0315288 A1  12/2009 Hernandez

* cited by examiner

Primary Examiner — Clayton E LaBalle
Assistant Examiner — Dennis Hancock
(74) Attorney, Agent, or Firm — Botkin & Hall, LLP

(57) ABSTRACT

A rotating and sliding device is provided with a linear rail and a guide rail. A carriage with a rotating table travels along the linear rail. A second pivot point on the table is attached to an arm that travels along the guide rail. When the guide rail is askew from the linear rail, the linkage between the arm and the table causes the table to rotate as the device slides along the linear rail.

16 Claims, 10 Drawing Sheets

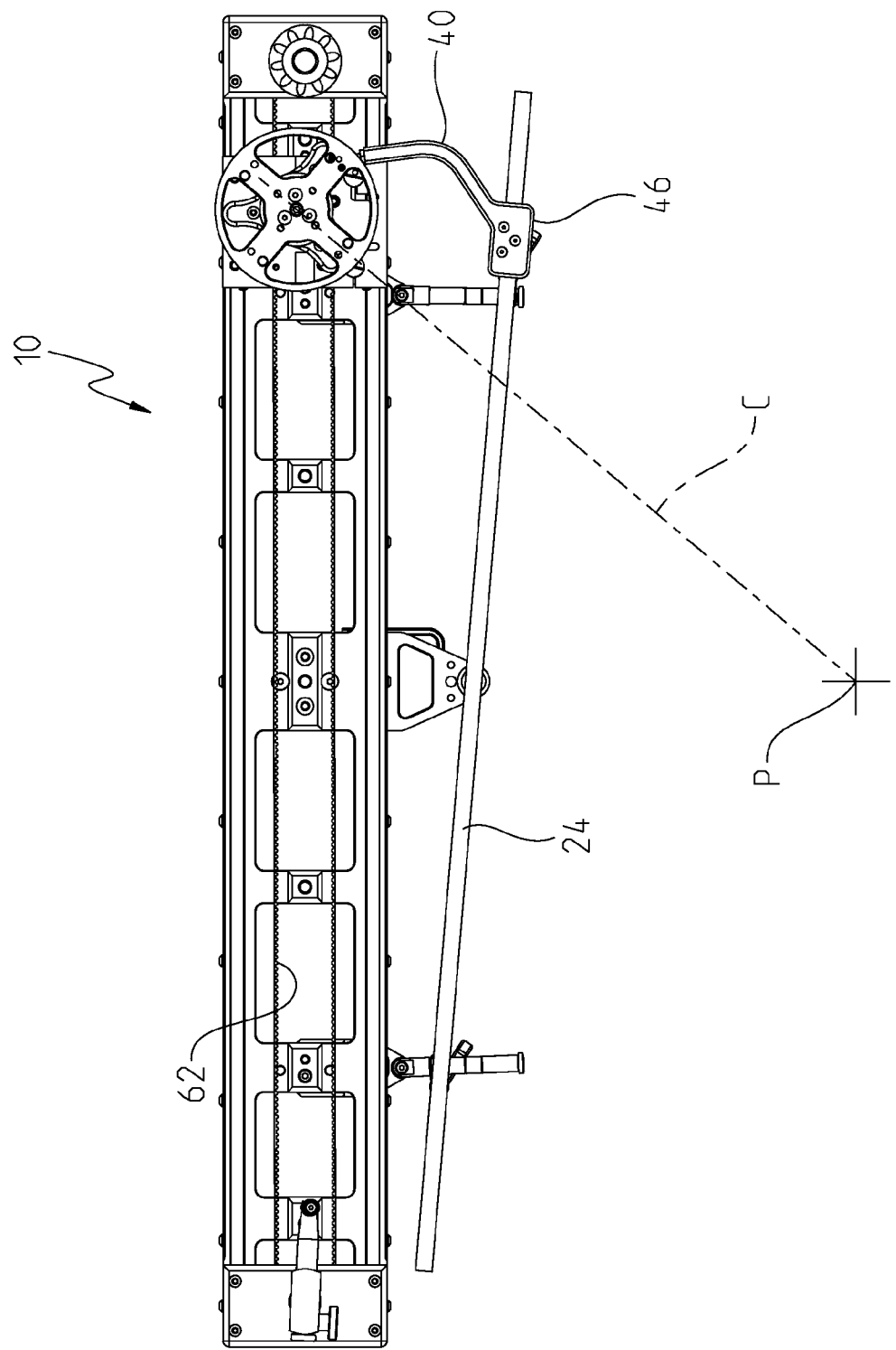

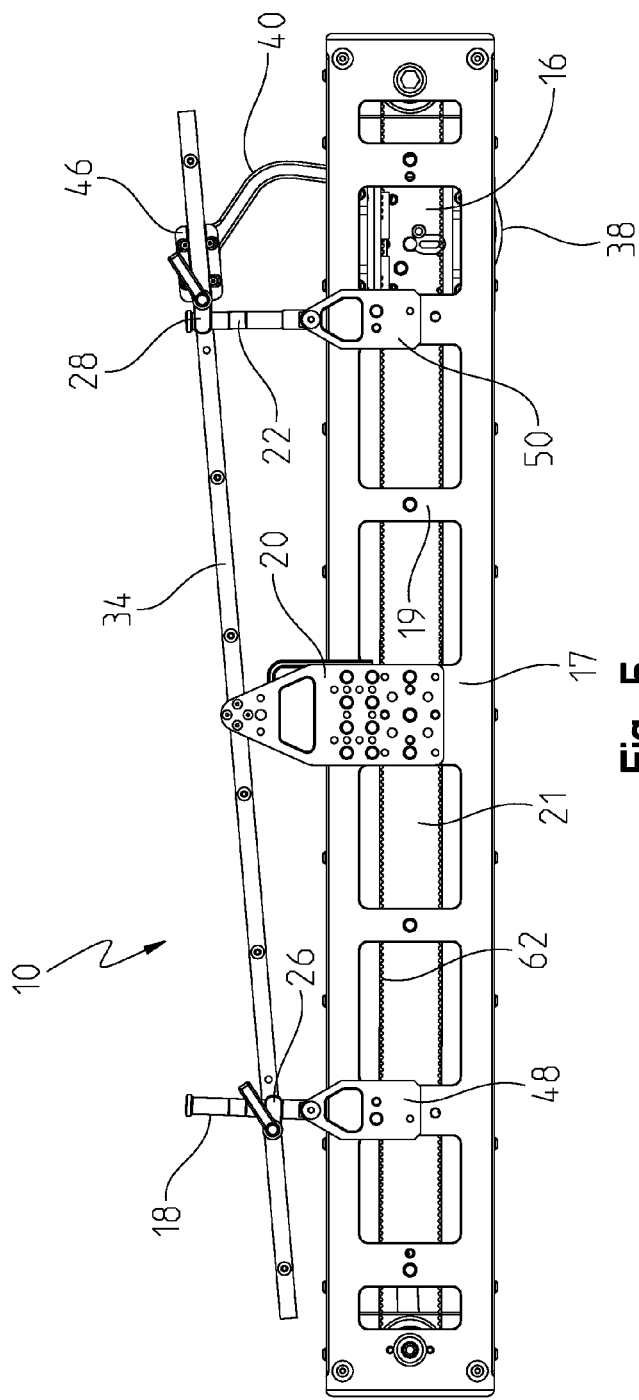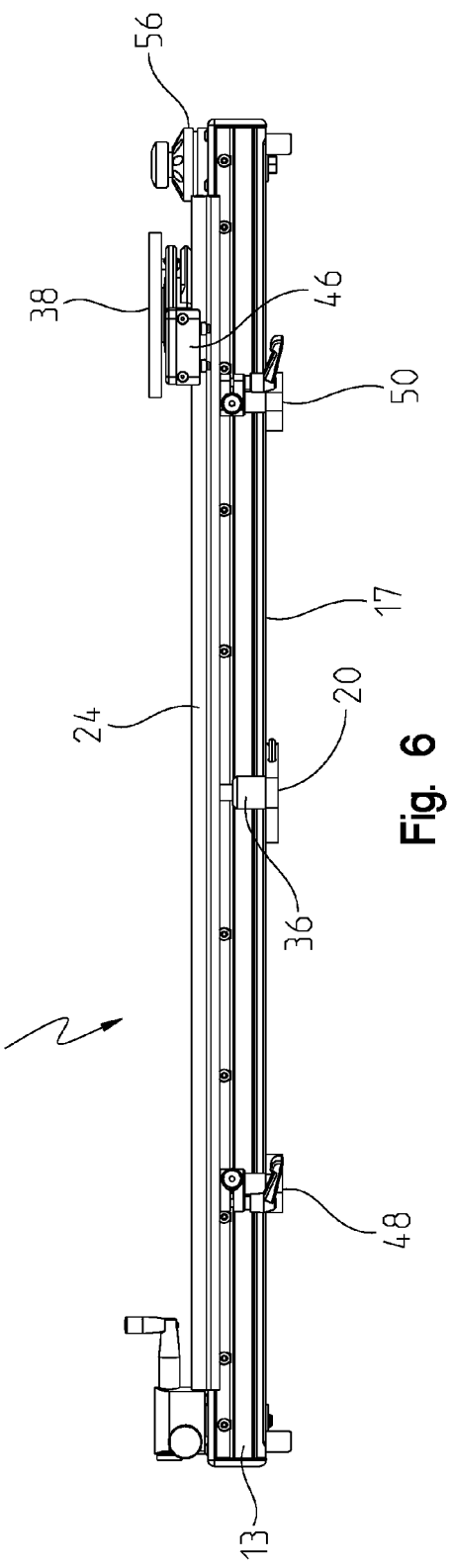

PANNING SLIDER

CROSS REFERENCE TO RELATED APPLICATION

This application claims the benefit of U.S. Provisional Application No. 61/816,218, filed Apr. 26, 2013, the disclosure of which is hereby incorporated by reference.

BACKGROUND OF THE INVENTION

This present disclosure relates to a motion control device, such as a slider, suitable for moving an object, such as a camera, along a defined path. Sliders are well known in the photographic and cinematographic arts. A slider is typically defined by a rail system having a pair of parallel rails with a slider tray carried on the rails and a camera is mounted to the slider tray. Sliders are useful for producing a camera shot where the camera needs to be moved along a defined path. Sliders may define a straight or curved path, and allow for a smooth and repeatable camera movement. It is common for motors to drive the slider so that the slider moves at a defined rate along the rails. Such motors are capable of providing precise movements at variable speeds.

In some instances, it is desired to have the camera not only move along a defined path, but to also have the camera pan as it moves. Previously, panning required use of a motor which rotated the camera at a precise rate and a precise time relative to the motion of the slider as it moves on the rails. Such motors are expensive and require a high degree of skill, and considerable time to program for a given shot to ensure the camera pans and slides in unison.

One common camera movement which illustrates the difficulty of coordinating the pan and slide movements is a "fixed point shot." In such a shot, the desired effect is to have the camera remain focused on a given stationary point spaced some distance from the slider as the camera moves along the rails. In order for the camera to point at the given point during the travel along the rails, the camera must rotate at a rate such that at any given position along the rails, the camera is pointed directly at the given point. While previous slider systems are capable of producing such a shot, they are only able to do so if set up by a highly skilled technician who carefully calibrates each of the respective motors. Therefore, an improved panning slider is needed.

SUMMARY OF THE INVENTION

The present disclosure describes a rail system having a pair of parallel rails for moving and panning a camera or other photographic equipment during a photo shoot. A carriage rides on the rails along a path defined by the rails. The rail system includes a guide member which is positionable independent to the pair of parallel rails. The carriage includes a table which is rotatably mounted on the carriage; the table is also mounted to an arm which rides on a carriage, which carriage is carried by the guide rail. In this way, the arm causes the table to rotate as the distance between the guide rail and the parallel rails changes, which rotation causes the camera to pan. One embodiment of the pan system pivots the guide rail at or near the center of the guide rail. This prevents the mean position of the guide being overly close or far away from the carriage. If the guide rail is too close or too far away, the assembly might bind at certain points in the linear travel.

Another embodiment involves the guide rail that is skewed to the parallel rails in two axes. The table is attached to the carriage such that it has more than one degree of freedom. This would allow the camera to pan side to side and up and down. This could be particularly useful if the camera needs to follow an object that moves in relation to the camera. At times, it may be desirable for the guide rail to be non-linear. This way a variable point can be followed as the carriage travels along the parallel rails.

The degree of the pan is dictated by the angle of the guide rail. In this way, the present disclosure describes a rail system which pans a camera as it moves along a rail system without the use of a pan motor.

BRIEF DESCRIPTION OF THE DRAWINGS

A preferred embodiment of this invention has been chosen wherein:

FIG. 4 is a top view of the rail system of FIG. 1 with the slider in the C position;

FIG. 5 is a bottom view of the rail system of FIG. 1;

FIG. 6 is a side view of the rail system of FIG. 1;

DESCRIPTION OF THE PREFERRED EMBODIMENT

Figure 7:
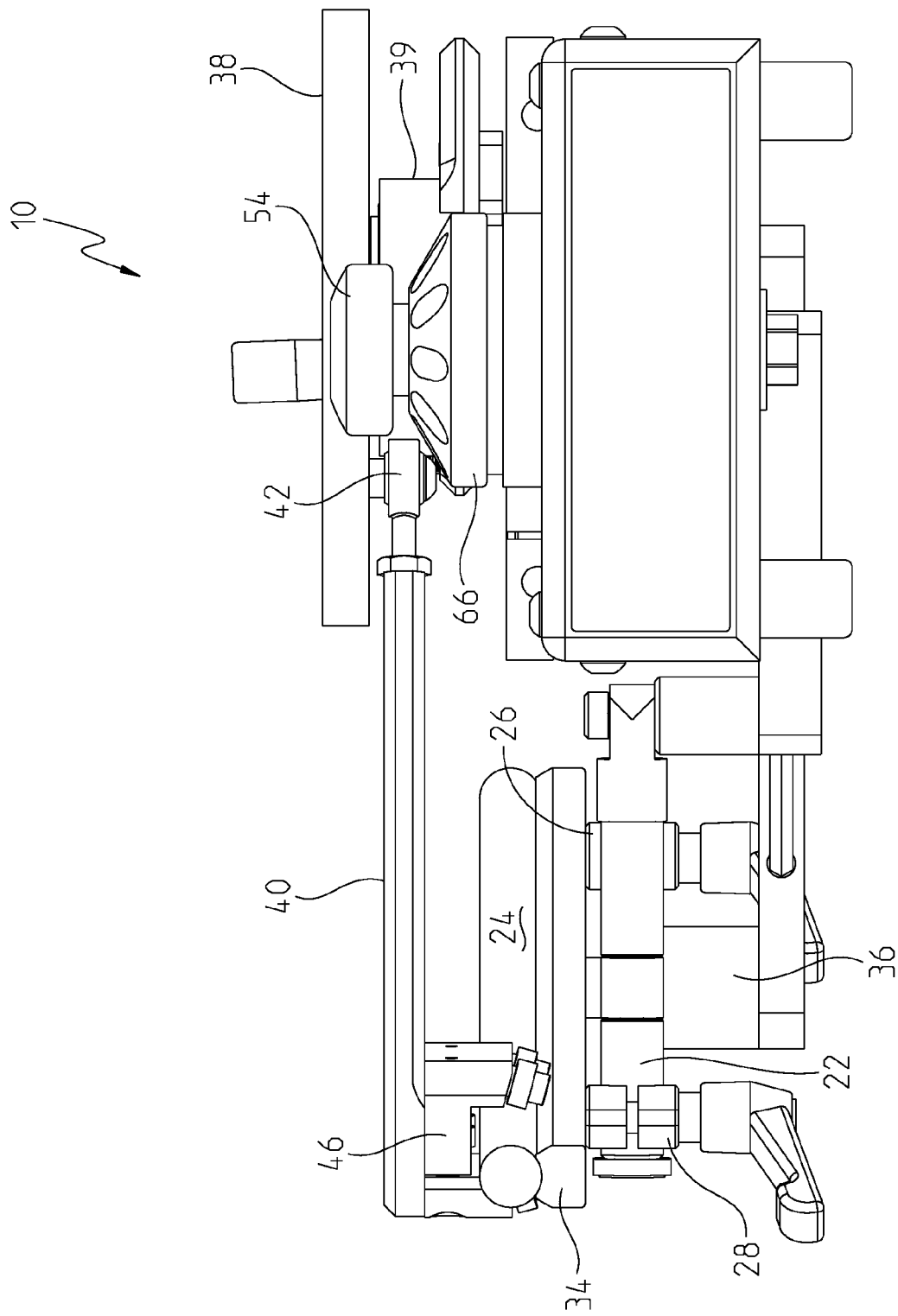
FIG. 7 is an end view of the rail system of FIG. 1.
Figure 8:
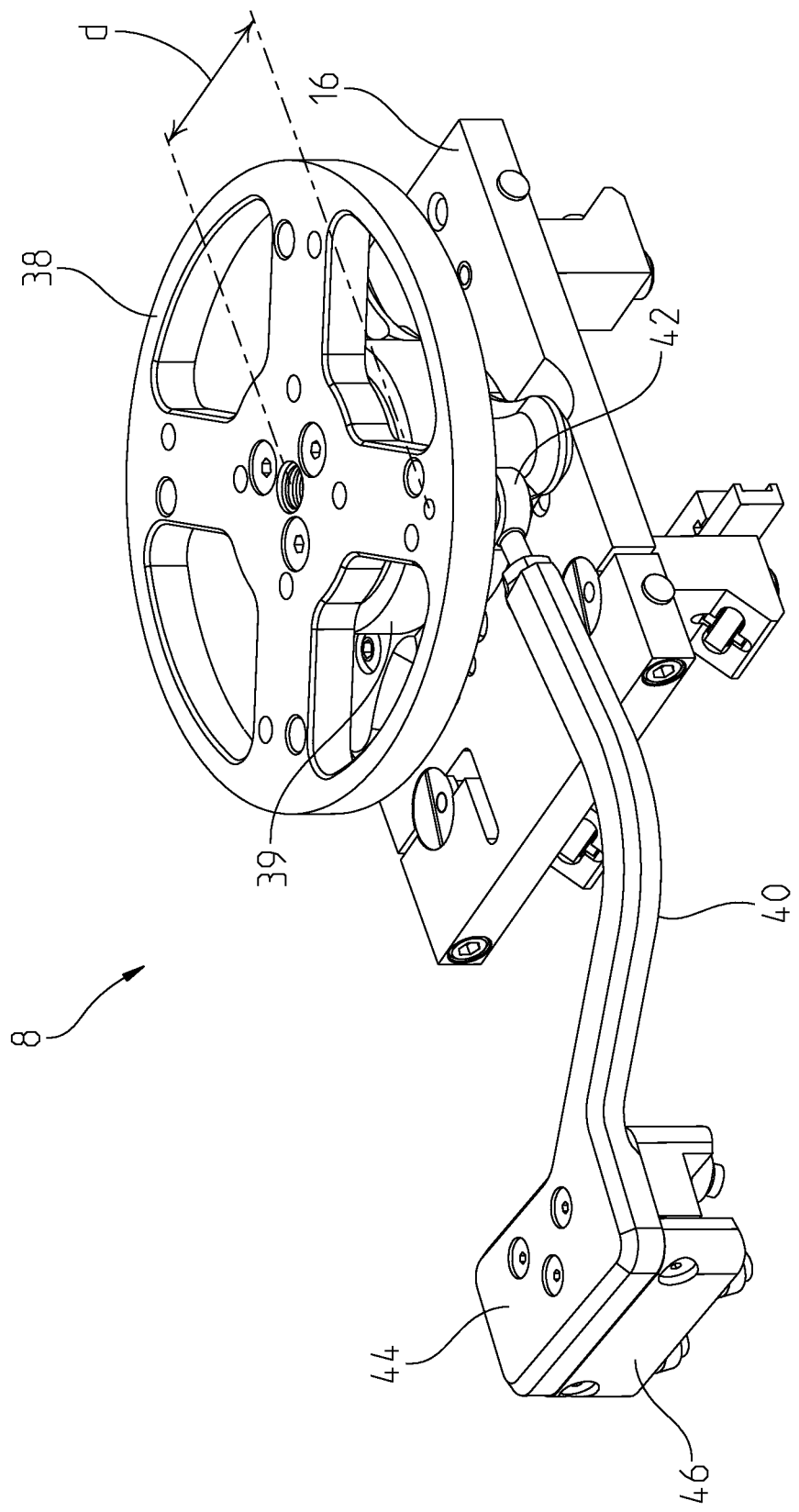
FIG. 8 is a perspective view of the movable assembly of FIG. 1.
Figure 9:
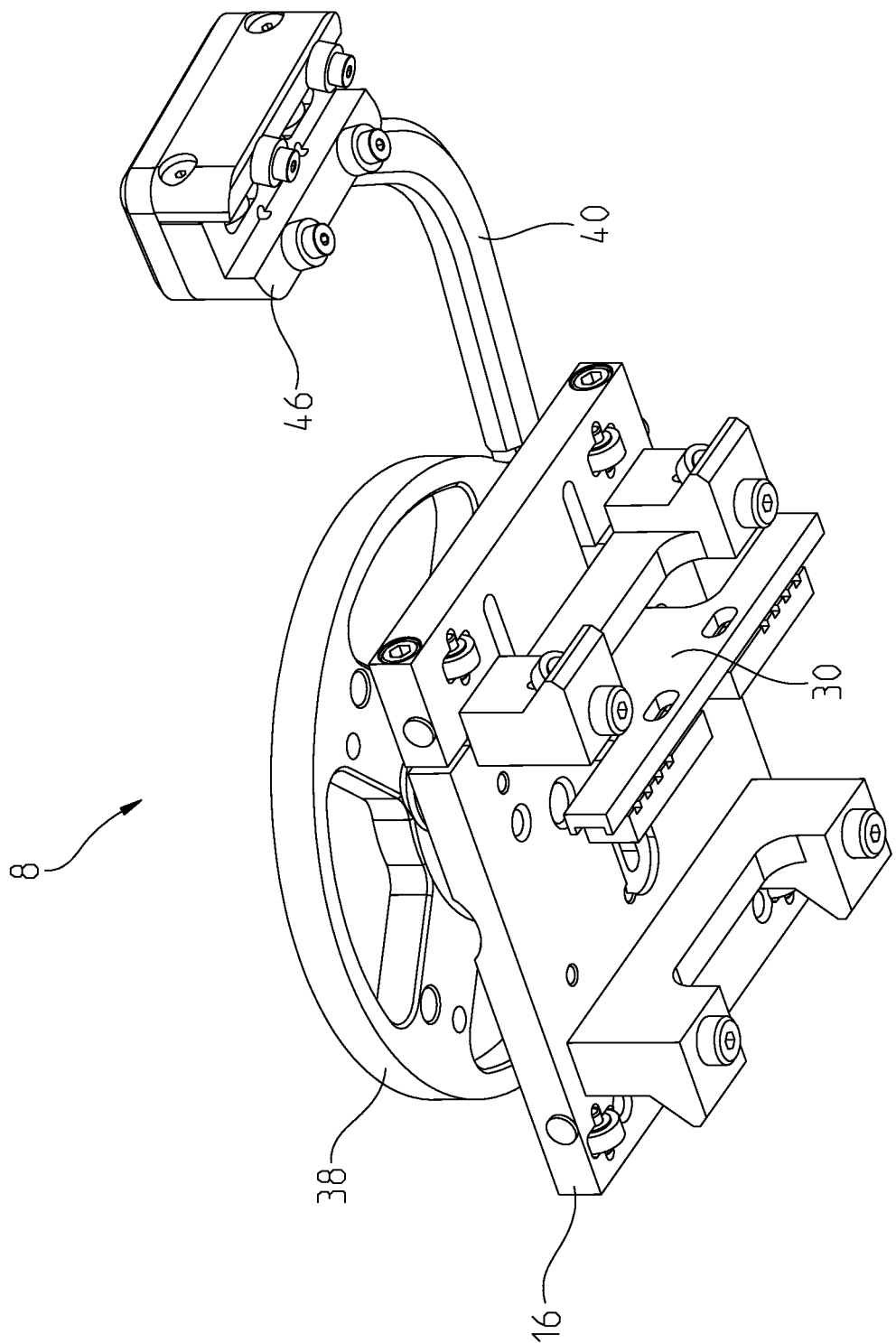
FIG. 9 is an underneath perspective view of the movable assembly of FIG. 1.
Figure 11:
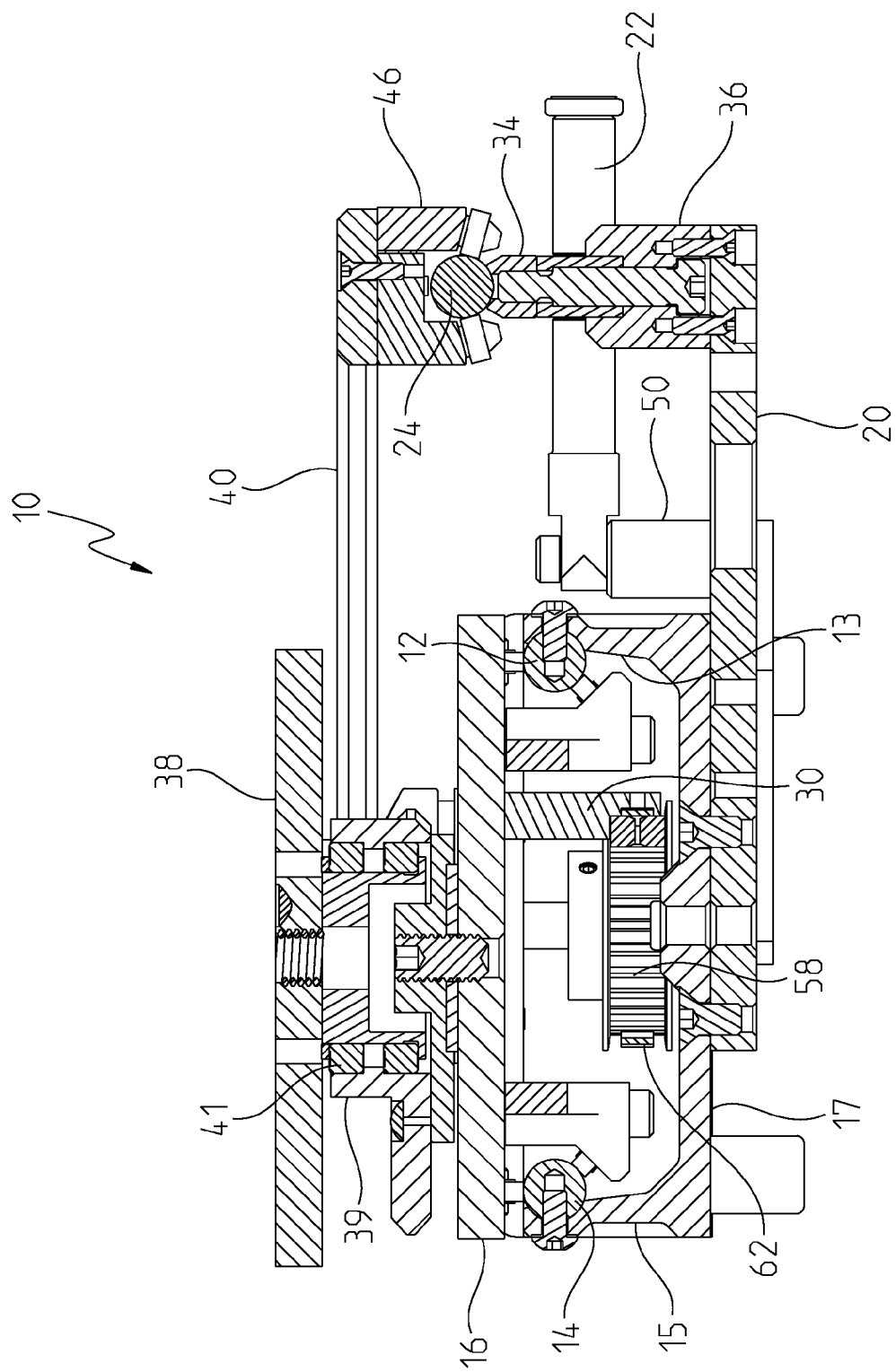
FIG. 11 is an end section 11-11 view of the rail system of FIG. 2.

The present disclosure describes a rail system 10 having a pair of parallel rails 12, 14 as shown in FIG. 11. The movable assembly 8, as shown in FIGS. 8 & 9 include a carriage 16, an arm 40, and a linear bearing 46. The carriage 16 rides on the parallel rails 12, 14 and is movable along a path defined by the parallel rails 12, 14. The parallel rails 12, 14 are fixed relative one another by a frame 17 as shown in FIG. 5. The frame 17 is adapted for holding the rails 12, 14 and providing structure to the rail system 10. The frame 17, as depicted here, is constructed from a pair of upright walls 13, 15 which mount the rails 12, 14, as is shown in FIG. 7, which walls are connected by a series of spanning members 19, the spanning members defining a plurality of openings 21 which provide weight savings to the rail system 10 as is shown in FIG. 5. The spanning members 19 collectively define the base on which the rail system 10 is supported. The spanning members 19 may include one or more apertures suitable for accepting a fastener for mounting the rail system 10 to a surface.

One advantage of the present rail system 10 is that it is suitable for use in any orientation. The spanning members 19 include apertures which allow the rail system 10 to be mounted to any suitable surface, be it a horizontal surface like the ground, a vertical surface like a wall, or any other suitable surface. Typical panning systems use motor-driven rotation for the camera, and such motors typically aren't engineered to be used in any orientation other than horizontal (the motors are typically not rated to pull against gravity when panning) The current system does not rely on a panning motor. Instead, the current system pans as the slider moves, thereby, the system which moves the slider also causes the panning action through the mechanical system. In this way, the present rail system 10 provides significant improvements and versatility as compared to previous slider systems.

Figure 2:
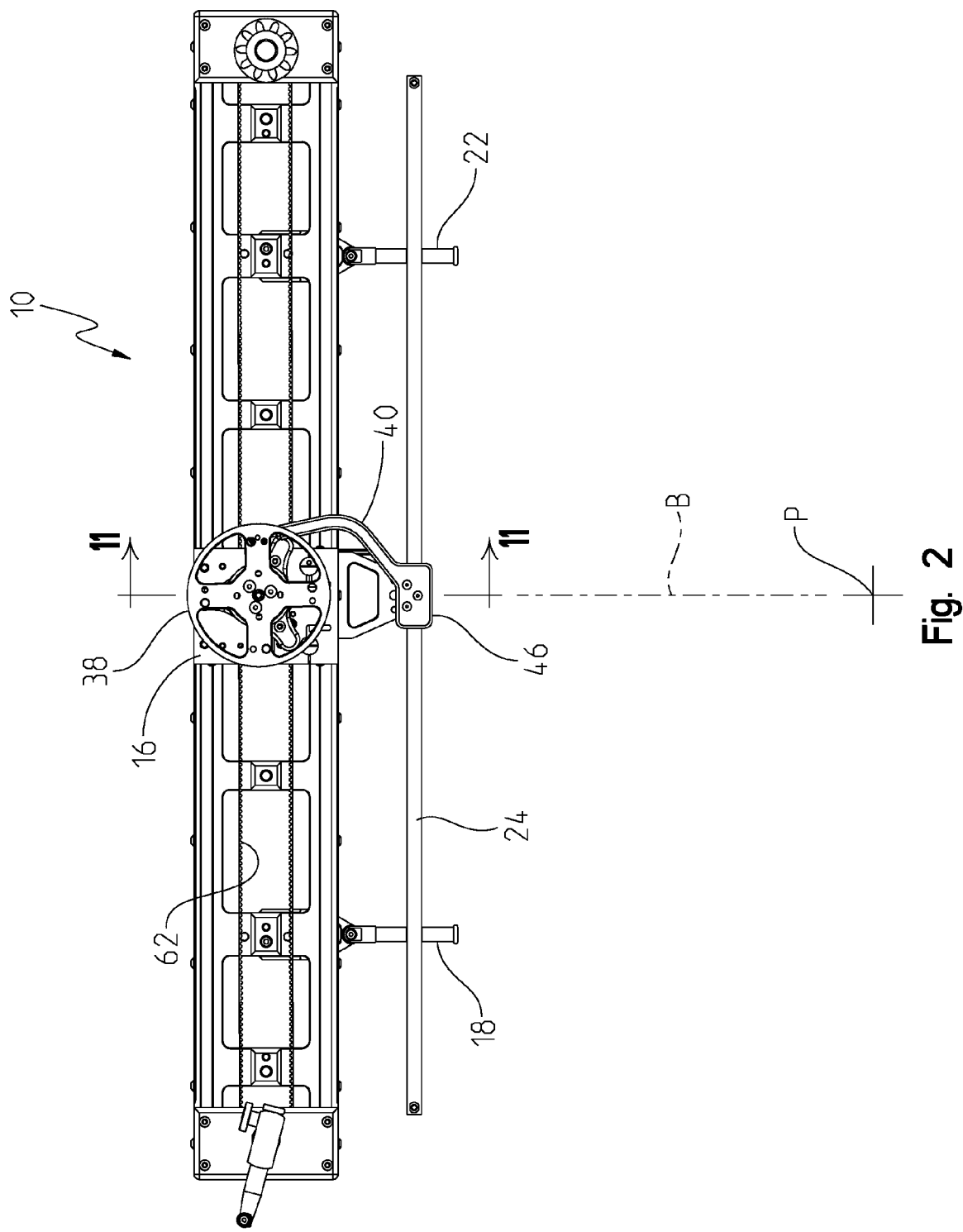
FIG. 2 is a top view of the rail system of FIG. 1 with the slider in the B position.
Figure 3:
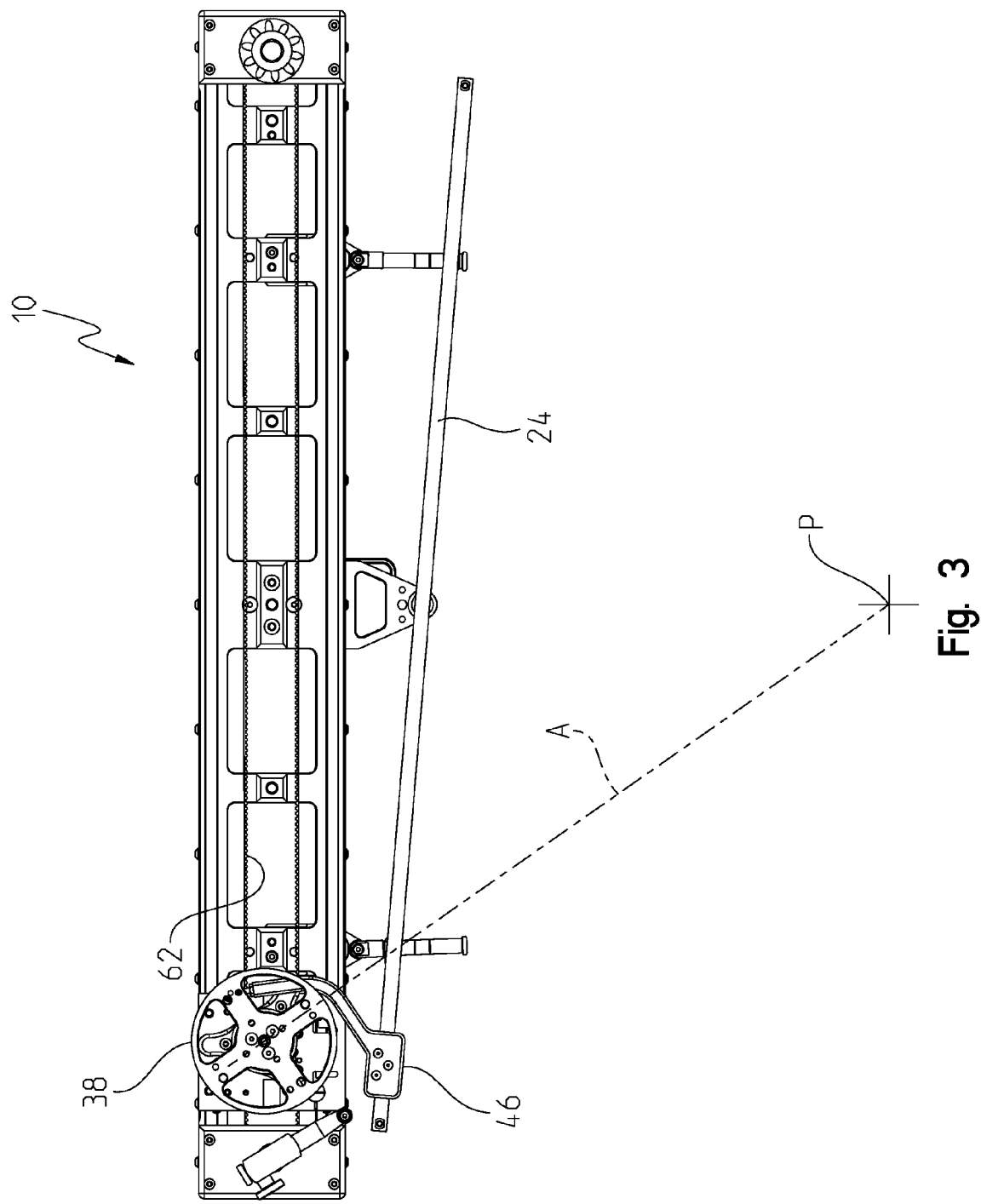
FIG. 3 is a top view of the rail system of FIG. 1 with the slider in the A position.

The rail system 10 includes a series of supports extending perpendicularly away from the parallel rails, preferably three supports 18, 20, 22 as is shown in FIGS. 2-5. The three supports 18, 20, 22 together support a guide rail 24. The two outer supports 18, 22 are rods which each carry a respective slideable clamp 26, 28, with the respective clamp mounted to a crown 34 shaped to support the guide rail 24. The slidable clamps 26, 28 are movable along the respective outer supports 18, 22 to adjust the angle of the guide rail 24 relative the parallel rails 12, 14. The guide rail 24 is shown substantially parallel to the parallel rails 12, 14 in FIG. 2 and askew in FIGS. 3-5. The middle support 20 includes a crown 34 which is shaped to support the guide rail 24. The crown 34 is mounted on a pivot member 36 about which the guide rail is rotatable on the middle support 20 to allow the guide rail 24 to pivot relative the parallel rails 12, 14. Different positions of the guide rail 24 are shown in FIGS. 2 and 3.

Figure 1:
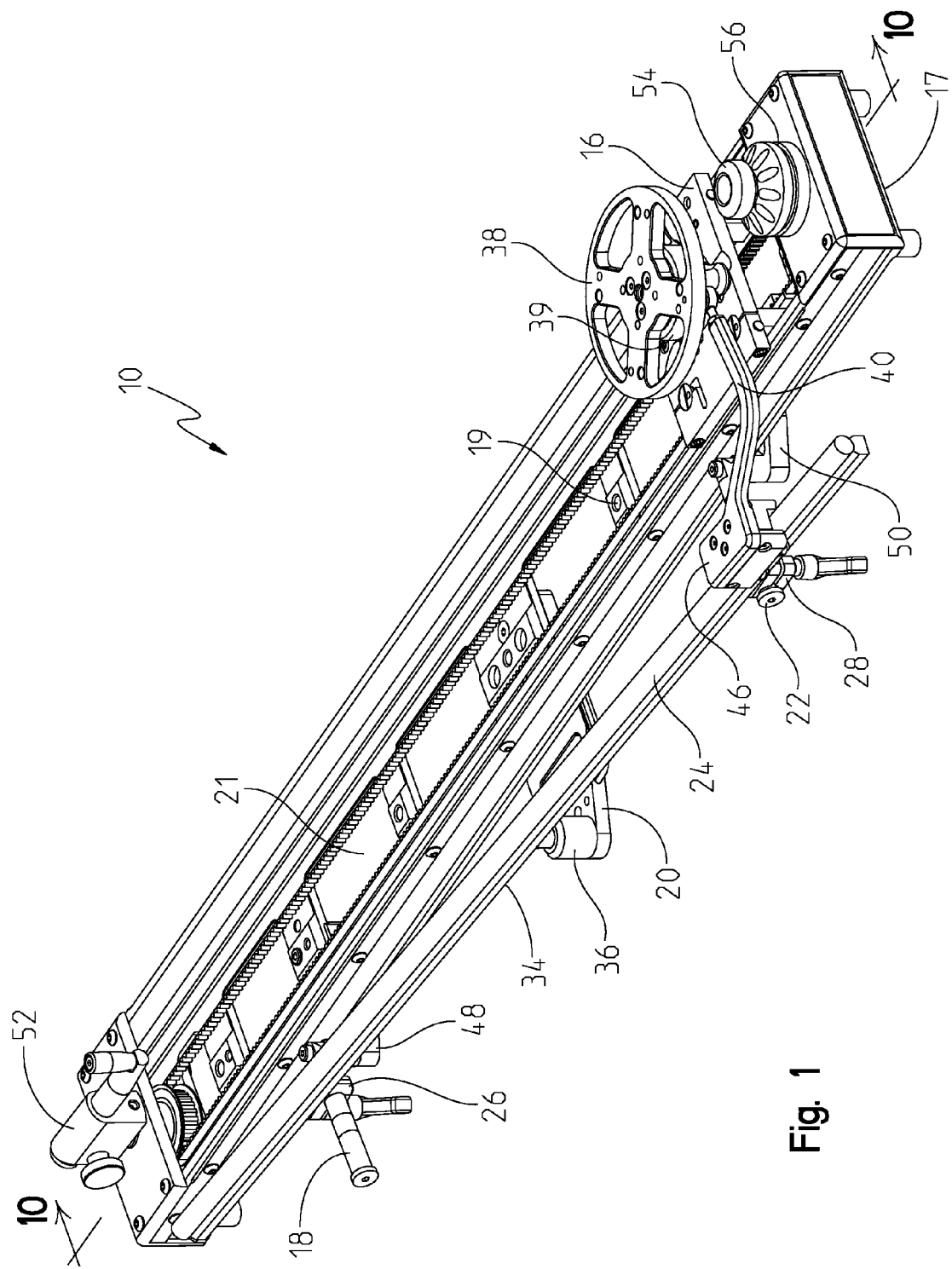
FIG. 1 is a perspective view of the rail system of the present disclosure.
Figure 10:
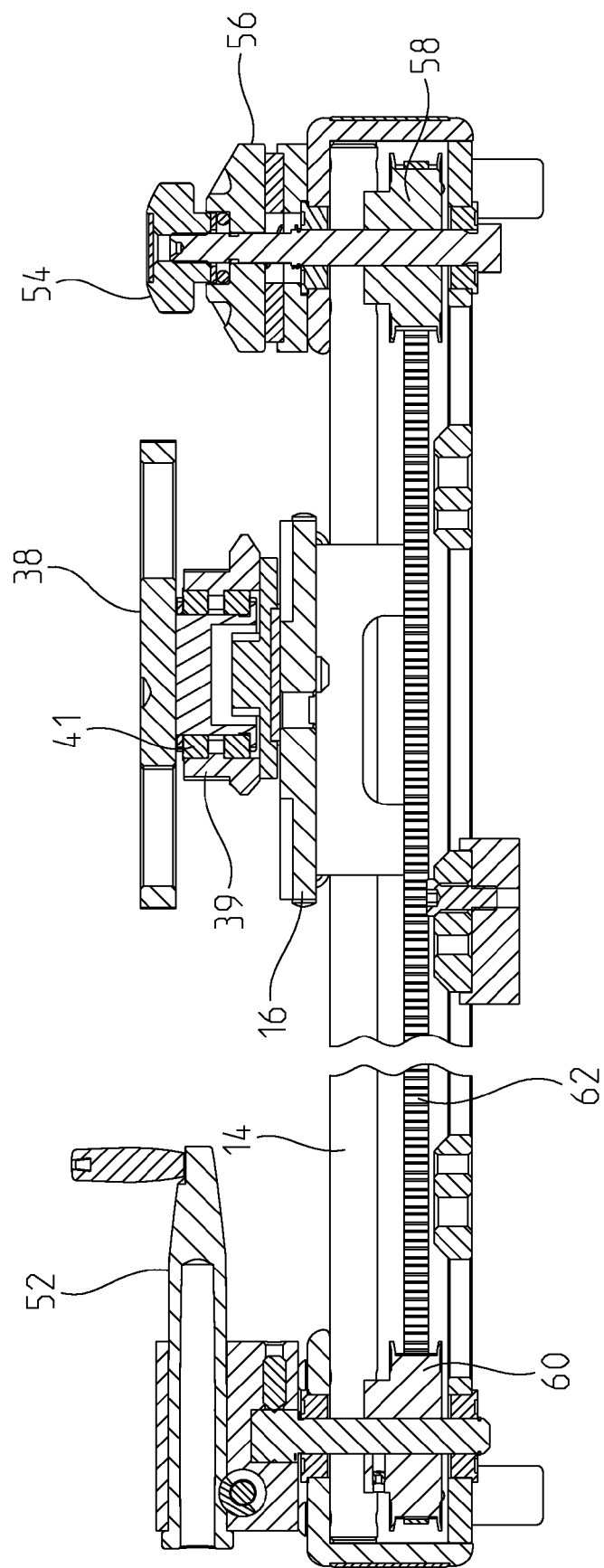
FIG. 10 is a partial side section 10-10 view of the rail system of FIG. 1.

A table 38 is mounted to the upper surface of the carriage 16 such that the table 38 is rotatable relative the carriage 16 as is shown in FIG. 1. As illustrated in FIGS. 3 and 4, the table 38 is pivotal on a shaft 39, which shaft 39 allows the table to rotate relative the carriage 16. The shaft 39 has a central axis about which the shaft 39 rotates. A bearing 41 FIG. 10, is sandwiched between the table 38 and the carriage 16 and surrounds the perimeter of the shaft 39, which bearing both provides support to the table 38, and allows smooth rotation thereof As is shown in FIG. 7, an arm 40 is mounted at a pivot point 42 to table 38 near a perimeter edge of the table 38 in a way that allows the arm 40 to rotate the table 38. The arm 40 is mounted at a second end 44 to a linear bearing 46 which is slidable along the guide rail 24.

As assembled, when the carriage 16 is moved laterally along the parallel rails 12, 14, the linear bearing will move along the guide rail 24. The carriage 16 can either be driven manually by a handle 52 or with a motor. The handle 52 connects to a drive pulley 60 which is mated to a drive belt 62 as is shown in FIG. 10. The carriage 16 is affixed to a section of the drive belt 62 via link 30, FIG. 9. As the drive belt 62 moves laterally, the carriage 16 is pulled along. Opposite the drive pulley is a slave pulley 58 which is connected to a brake 56. The brake 56 provides a frictional drag to the slave pulley 58, which translates to drag on belt to resist motion. The amount of drag the brake 56 provides is adjusted by a knob 54 that is adjacent to the brake 56. As the distance between the parallel rails 12, 14 and the guide rail 24 changes, the arm 40 will cause the table 38 to rotate relative the carriage 16. As the linear bearing 46 moves toward or away from the carriage 16, the arm 40 is moved by the linear bearing 46, which causes the table 38 to rotate due to the spacing between the pivot point of where the arm connects to the table and axis of the shaft 39. This spacing is best seen as distance "d" in FIG. 8. This rotation of the table 38 is shown in FIGS. 3 and 4.

One application of the present invention is to mount a camera (not shown) to the table 38, such that as the camera travels along the parallel rails 12, 14, the guide rail 24 can be positioned at a preferred angle which will cause the camera to pan at a preferred rate as the carriage 16 moves along the rails 12, 14.

As previously described, the outer supports 18, 22 are rods which are joined at one end to the frame 17. Respective slidable clamps 26, 28, FIG. 7 are mounted to the outer supports 18, 22. The slidable clamps 26, 28 are adapted for being moved longitudinally along the length of the respective outer supports 18, 22, and are each clampable at a desired position along the outer supports 18, 22, with the position defining the angle at which the guide rail 24 is positioned relative the parallel rails 12, 14.

The middle support 20, as mentioned, includes a pivot member 36. In the preferred embodiment, the pivot member 36 is mounted a fixed distance from the parallel rails 12, 14 as is shown in FIG. 5. In this way, the linear bearing 46 is always a fixed distance from parallel rails 12, 14 when the carriage is located above the pivot member 36. In this way, when the linear bearing 46 is at the pivot member 36, the table 38 will be at a defined rotational position, preferably aligned such that an attached camera is aimed perpendicularly to the parallel rails 12, 14. In this way, regardless of the positioning of each of the slideable clamps 26, 28, when the linear bearing 46 arrives at the pivot member 36, the table will have rotated to a position where the camera is pointed perpendicularly to the parallel rails 12, 14.

One sliding and panning move that the rail system 10 is specially adapted to provide is a fixed point shot. The fixed point shot is set up by first moving the slidable clamps 26, 28 to a position where the guide rail 24 is parallel with the parallel rails 12, 14, and centering the linear bearing 46 above the pivot member 36, as illustrated in FIG. 2. In this position, the table 38 is aligned such that the camera will point perpendicularly to the parallel rails 12, 14, marked as B. The user then sets up the camera to be focused on the desired fixed point, marked as P. With the camera properly configured, the slidable clamps 26, 28 are moved to a desired position which positions the guide rail 24 at a specified angle relative the parallel rails 12, 14, such as is shown in FIG. 3. The carriage 16 is subsequently moved to one end of the rail system 10, marked as A. The user then begins taking the shot and begins moving the carriage 16 along the parallel rails until the slider is positioned as is shown in FIG. 4, marked as C. As the carriage 16 moves from A to C, the linear bearing 46 moves along the guide rail 24 causing the arm 40 to rotate the table 38. This keeps the camera pointed at the fixed point throughout the movement of the carriage 16.

The rail system 10 illustrated in the Figures is shown as a linear rail. It is anticipated that the present three-rail system could be used with either linear or curved rails to achieve the mechanical panning described herein. The carriage 16 is moved relative the frame 17 by any means known in the art, such as by a motor, by a hand crank, by hand, or by any other suitable system. It is also possible to have only the outer supports 18 and 22 as supports for the guide rail 24.

The outer supports 18, 22 are joined to the frame 17 by respective mounts 48, 50, FIG. 5. The mounts 48, 50, are each attached to the underside of the frame 17.

The crown 34 is pivotally mounted to the respective slidable clamp 26, 28 to allow the guide rail 24 to move to the prescribed angle relative the parallel rails 12, 14.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:
1. A panning slider comprising:
 a set of parallel rails,
 a carriage slidably affixed to said rails;

a table, rotatable with respect to said carriage about a first pivot point on said carriage;

an elongate guide member separately located from said rails and selectively fixed from movement with respect to said rails, said guide member having a first position substantially parallel to said rails and movable to a second position skewed with respect to said rails; and a linkage, slidably affixed to said elongate guide member and pivotally affixed to said table at a second pivot point, said first and second pivot points being spaced apart on said table, whereby lateral movement of said carriage along said rails causes said linkage to rotate said table with respect to said carriage when said elongate guide member is held in its skewed position with respect to said rails.

2. The panning slider according to claim 1, a drive pulley, a slave pulley, and a belt, said belt wrapped around said drive pulley and slave pulley, said carriage affixed to a portion of said belt located between said drive pulley and said slave pulley such that when said drive pulley is rotated, said carriage moves laterally along said rails.

3. The panning slider according to claim 2, said slave pulley including a brake.

4. The panning slider according to claim 3, said linkage comprising a linear bearing slidingly engaged with said guide member and an arm affixed to and extending from said linear bearing.

5. The panning slider according to claim 1, said elongate guide member having distal ends, said guide member being pivotably affixed with respect to said rails at a point intermediate to said distal ends.

6. The panning slider according to claim 5, said elongate guide member substantially linear.

7. The panning slider according to claim 6, a drive pulley, a slave pulley, and a belt, said belt wrapped around said drive pulley and slave pulley, said carriage affixed to a portion of said belt located between said drive pulley and said slave pulley such that when said drive pulley is rotated, said carriage moves laterally along said rails.

8. The panning slider according to claim 7, said elongate guide member having distal ends, said guide member being pivotably affixed with respect to said rails at a point intermediate to said distal ends.

9. A variable vantage point positioning device, comprising:
a set of parallel rails;
a carriage for lateral travel along said rails;
a guide rail, said guide rail having a position substantially parallel to said rails and moveable into a skewed position with respect to said rails and being selectively lockable at both said positions and positions intermediate to said parallel and said skewed positions;

a table, rotatable with respect to about a first pivot point to said carriage;
a second carriage for lateral travel along said guide rail; and
a linkage connecting said second carriage and pivotably affixed to said table at a second pivot point, said second pivot point spaced from said first pivot point.

10. The positioning device according to claim 9, a drive pulley, a slave pulley, and a belt, connecting both of said pulleys, said belt affixed to said carriage such that when said drive pulley is rotated, said carriage moves laterally along said rails.

11. The positioning device according to claim 10, said slave pulley including a brake.

12. The positioning device according to claim 11, said guide rail substantially linear.

13. A panning slider comprising:
a set of parallel rails,
a carriage slidably affixed to said rails;
a table, rotatably affixed to said carriage and pivotal about a first pivot point;
an elongate linear guide member separately located from said rails and selectively fixed from movement with respect to said rails in a first position, substantially parallel to said rails and movable to a second position, skewed with respect to said rails;
a linkage, comprising a linear bearing and an arm affixed to said linear bearing, said bearing slidably affixed to said elongate guide member and said arm pivotally affixed to said table at a second pivot point, said first and second pivot points being spaced apart on said table;
movement of said carriage along said rails causes said linkage to rotate said table about said first pivot point with respect to said carriage when said elongate guide member is held in said skewed position with respect to said rails;
said elongate guide member having distal ends, said guide member being pivotably affixed with respect to said rails at a point intermediate to said distal ends; and
a stop affixed substantially at the endpoints of said rails to limit the axial movement of said carriage.

14. The panning slider according to claim 13, a drive pulley, a slave pulley, and a belt connecting said pulleys, said belt affixed to said carriage such that when said drive pulley is rotated, said carriage moves laterally along said rails.

15. The panning slider according to claim 14, said slave pulley including a brake.

16. The panning slider according to claim 15, said parallel rails and said elongate guide member being coplanar.

* * * * *